United States Patent [19]
König et al.

[11] Patent Number: 6,008,289
[45] Date of Patent: Dec. 28, 1999

[54] COATING SLIPS WITH POLYISOCYANATES

[75] Inventors: Joachim König, Odenthal; Eckhard Wenderoth, Leverkusen; Jürgen Kopp, Odenthal; Gottfried Wallpott, Köln, all of Germany

[73] Assignee: Bayer Aktiengesellschaft, Leverkusen, Germany

[21] Appl. No.: 08/983,375

[22] PCT Filed: Jul. 8, 1996

[86] PCT No.: PCT/EP96/02985

§ 371 Date: Jan. 16, 1998

§ 102(e) Date: Jan. 16, 1998

[87] PCT Pub. No.: WO97/04169

PCT Pub. Date: Feb. 6, 1997

[30] Foreign Application Priority Data

Jul. 19, 1995 [DE] Germany .............................. 195 26 278

[51] Int. Cl.$^6$ ................ C08J 3/00; C08K 3/20; C08L 75/00; B32B 27/00
[52] U.S. Cl. .................. 524/591; 162/119; 162/135; 162/164.6; 427/372.2; 427/385.5; 427/391; 428/423.1; 428/425.1; 524/590; 524/839; 524/840
[58] Field of Search .................... 524/590, 591, 524/839, 840; 428/423.1, 425.1; 427/372.2, 385.5, 391; 162/119, 135, 126, 164.6

[56] References Cited

U.S. PATENT DOCUMENTS

| | | | |
|---|---|---|---|
| 4,663,377 | 5/1987 | Hombach et al. | 524/196 |
| 5,252,696 | 10/1993 | Laas et al. | 528/49 |
| 5,503,714 | 4/1996 | Reiners et al. | 162/164.6 |
| 5,718,804 | 2/1998 | Jansen et al. | 162/164.6 |

FOREIGN PATENT DOCUMENTS 9505505 2/1995 WIPO .............. D21H 19/54

OTHER PUBLICATIONS

Bernhard Jansen, et al., Process for Finishing Paper Using Polyisocyanates having Anionic Groups.
U.S. Patent Application No. 08/973,066. Filed Nov. 25, 1997. (Le A 30 975).
Bernhard Jansen, et al., Repulpable Cellulose–Containing Materials.
U.S. Patent Application No. 08/860,144. Filed Jul. 19, 1997. (Le A 30 744) pp. 1A–28, plus copy of filing receipt.
Harro Traubel et al., Process for Imparting Wet Strength to Paper.
U.S. Patent Application No. 08/041,731. Filed Apr. 1, 1993. (Le A 28 857) pp. 1–29, plus copy of filing receipt.
W. Kogler, et al. Kationische Streichfarben—Derzeitiger Stand und Ausblick Wochenblatt für Papierfabrikation, 1989, vol. 13, pp. 5419–554.
R. Pelzer, et al., Nassfestmittel heute—morgen? Wochenblatt für Papierfabrikation, 1989, vol. 11/12. pp. 499–804.
Ullman, Encyclopädie der techn. Chemie, 4. Auflage, vol. 17, (1979) pp. 608–609.
Ullman, Encyclopedia of Industrial Chemistry, vol. A18, (1991) pp. 650–651.
H. Graab, Derzeitiger Stand und Entwicklungstendenzen der Streichmaschinen Das Papier 10 (1986), vol. 10a, pp. 125–133.

*Primary Examiner*—Patrick D. Niland
*Attorney, Agent, or Firm*—Joseph C. Gil; Richard E.L. Henderson

[57] ABSTRACT

The present invention relates to pigmented coating slip suitable for the production of coated papers and boards containing (a) a coating pigment,
(b) 5 to 20%, based on the coating pigment, of at least one synthetic binder,
(c) optionally, 0.01 to 20%, based on the coating pigment, of a naturally occurring binder,
(d) optionally, 0.01 to 5%, based on the coating pigment, of a cobinder,
(e) 0.01 to 5%, based on the coating pigment, of an optical brightener,
(f) 0.01 to 5%, based on the coating pigment, of at least one water-dispersible polyisocyanate, and
(g) optional additives.

7 Claims, No Drawings

COATING SLIPS WITH POLYISOCYANATES

The present invention relates to improved coating slips and a process for the production of coated papers and boards.

Aqueous coating slips based on inorganic coating pigments and polymeric binders are usually used for the production of coated papers and boards. Customary coating pigments for coating paper are China clay and calcium carbonate, as well as talc, satin white, aluminium hydroxide and titanium dioxide. Customary synthetic binders for coating slips for paper are, for example, styrene/butadiene, styrene/butyl acrylate and acrylic ester polymers and copolymers, vinyl acetate polymers and copolymers and polyurethanes. Starch or casein are chiefly suitable as naturally occurring binders.

In addition, in many cases the coating slips comprise optical brighteners for increasing the whiteness, and hydrophilic cobinders, such as polyethylene glycol, polyvinyl alcohol, polyvinylpyrrolidone, carboxymethylcellulose, alginates, guar, galactomannans and copolymers based on acrylic acid or methacrylic acid with alkyl esters of acrylic acid or methacrylic acid. These cobinders serve on the one hand as thickening agents for establishing and stabilizing the viscosity of the coating slip for paper, and on the other hand as a carrier for optical brighteners which substantially increases the activity and light-fastness of the brightener. Although on the one hand a shift in the greying limit of optical brighteners to higher use concentrations and a considerable increase in the whiteness can be achieved by using these cobinders, the hydrophilicity of these components on the other hand reduces the resistance of the coated paper to water to an undesirable extent.

The fastness of the optical brighteners to bleeding is also impaired in many cases by the hydrophilic cobinders.

The addition of crosslinking agents, such as polyamidoamines/epichlorohydrin resin, epoxy resin, polyethyleneimine, ammonium zirconyl carbonate, urea- and melamine-formaldehyde resins or dialdehydes, such as glyoxal, in order to avoid the disadvantages mentioned is known: "Wochenblatt für Papierfabrikation 1989, page 499 and Ullmann, Encyclopädie der technischen Chemie [Encyclopedia of industrial chemistry] Volume 17, page 608". Epichlorohydrin resins indeed have a good activity as crosslinking agents. However, their high cationic charge leads to rheology problems and to fluorescence quenching and a reduction in the whiteness because of their interaction with the anionic binder and the optical brightener. Urea- and melamine-formaldehyde condensates, moreover, are undesirable in many cases because of their formaldehyde load, or, like epoxy resins, ammonium zirconyl carbonate and glyoxal, in many cases have only little action.

Polyisocyanates are mentioned as crosslinking agents in specific cast coating processes in DE-A-4 327 336. The operating speed is limited to about 30–90 m/minute. However, there is no indication at all as to which polyisocyanates could be suitable. Transfer of the process to customary high-speed coating machines with lower amounts applied has also not yet been successful, since there are considerably higher requirements on the rheology and viscosity stability of the coating colour here, and it has not as yet been possible to meet these satisfactorily.

Water-dispersible polyisocyanates have hitherto been employed for the production of optionally wood-containing papers which have been given a dry strength and/or wet strength treatment, these being employed either in the pulp or in a sizing press. A process for wet strength treatment of paper with the aid of water-dispersible polyisocyanate mixtures which contain 2 to 20% by weight of ethylene oxide units arranged in the form of polyether chains, the polyether chains containing on average 5 to 70 ethylene oxide units, is known specifically from DE-A-4 211 480. EP-A-0 582 166 describes the use of polyisocyanate mixtures which contain tertiary amino groups and/or ammonium groups and 0 to 30% by weight of ethylene oxide units in the form of polyether chains for the production of cellulosic sheet-like structures which have been given a dry strength and wet strength treatment and/or sized. DE-A-4 436 058 describes a process for the production of optionally wood-containing cellulosic sheet-like structures, such as paper, card and board, which have been given a dry strength and/or wet strength treatment and have an improved whiteness, using water-dispersible polyisocyanates which contain a content of 20 to 60% by weight of ethylene oxide units in the form of polyether chains of average molecular weight from 10 to 3500.

The products mentioned are usually employed in the paper pulp or are applied to the paper surface with the aid of, for example, a sizing press or film press.

The invention is based on the object of providing improved coating slips and a process for the production of coated papers and boards which produces satisfactory results on high-speed coating machines and ensures the fastness of optically brightened coating colours to bleeding.

The invention relates to a coating slip which is suitable for the production of coated papers and boards and comprises at least one synthetic binder and at least one water-dispersible polyisocyanate.

In a preferred embodiment, the coating slip comprises the customary constituents, such as optical brighteners, cobinders and, in particular, pigments. In a preferred embodiment, the binder is present in an amount of 5 to 20%, in particular 7 to 18%, based on the pigment.

In another preferred embodiment, the polyisocyanate is present in an amount of 0.01 to 5%, in particular 0.05 to 1%, based on the pigment.

The water-dispersible polyisocyanates are preferably polyisocyanates which a) are present in a mixture of isocyanates which are polyether-modified and isocyanates which are not polyether-modified, b) the isocyanate mixtures containing a proportion of alkylene oxide units, in particular ethylene oxide units, of 2 to 60% by weight, based on the isocyanate mixture.

In a preferred embodiment, the polyether chains in the polyether-modified isocyanate have an average molecular weight of 100 to 3500, calculated as the number-average Mn.

In a preferred embodiment, the isocyanates are aliphatic, cycloaliphatic, araliphatic or aromatic isocyanates. The isocyanates which are not polyether-modified preferably have an NCO functionality of 1.8 to 4.2, and the polyether-modified polyisocyanates preferably have an NCO functionality of 0.8 to 3.2. The isocyanate mixtures preferably contain 1 to 25% by weight of isocyanate groups, based on the isocyanate mixture.

In a preferred embodiment, the polyisocyanates to be used according to the invention are in nonionic form. However, they can also contain a content of tertiary amino and/or ammonium groups, in particular 1 to 500 milliequivalents per 100 g of isocyanate mixture a) and thus be in cationic form. The isocyanate mixtures can furthermore contain carboxyl and/or sulphonate groups, in particular 1 to 500 milliequivalents per 100 g of isocyanate mixture a), and can therefore be in anionic form.

The values stated for the NCO functionality of the water-dispersible polyisocyanates to be employed in the process according to the invention are based on the value which can be calculated from the nature and functionality of the starting components in accordance with the formula $$f = \frac{\sum valNCO - \sum valOH}{\sum \text{mol}(NCO+OH) - \sum valOH}.$$

The water-dispersible isocyanate mixtures a) preferably contain 1 to 23% by weight of isocyanate groups and have a content of ethylene oxide units of 2 to 60% by weight (based on the isocyanate mixture) in the form of polyether chains having an average molecular weight of 100 to 1000 (number-average).

If an improved repulpability of the papers treated in the coating with polyisocyanates is desired, the water-dispersible isocyanates comprise modified polyisocyanates (according to DE-A-4 446 334) which contain ester and/or amide structures and ensure an easier digestibility.

The term "water-dispersible" in connection with the polyisocyanates according to the invention means that, in a concentration of up to 70% by weight, preferably up to 50% by weight, and also using only low shear forces, for example by simple stirring in water, they give finely divided dispersions having particle sizes (ultracentrifuge) of <500 mn.

The water-dispersible polyisocyanates are obtainable by reaction, in any desired sequence, of:

I. one or more non-modified polyisocyanates having an average NCO functionality of 1.8 to 4.2, II. if appropriate polyisocyanates containing ester and/or amide structures, in particular according to DE-A-4 446 334, III. mono- or polyvalent polyalkylene oxide polyether alcohols containing on average preferably 5 to 70 ethylene oxide units and optionally containing ester groups, IV. if appropriate compounds which contain both at least one group which is reactive towards isocyanates and at least one cationically charged tertiary amino group and/or ammonium group, in particular according to EP-A-582 166 and DE-A-4 436 058, V. if appropriate compounds which contain both at least one group which is reactive towards isocyanates and at least one anionically charged, for example carboxyl and/or sulphonate, group and/or potentially anion-forming group.

Possible raw materials for the water-dispersible polyisocyanates according to the invention are, preferably, the following starting components:

I. Non-modified, aliphatic, cycloaliphatic, araliphatic or aromatic isocyanates of NCO functionality of 1.8 to 4.2. Aliphatic and cycloaliphatic polyisocyanates which contain uretdione and/or isocyanurate and/or allophanate and/or biuret and/or oxadiazine structures and are accessible by reactions of the prior art, which are known per se, from aliphatic, cycloaliphatic, araliphatic or aromatic diisocyanates are preferably used.

Examples which are mentioned of suitable such diisocyanates are: 1,4-diisocyanatobutane, 1,6-diisocyanatohexane, 1,5-diisocyanato-2,2-dimethylpentane, 2,2,4- and 2,4,4-trimethyl-1,6-diisocyanatohexane, 1,3- and 1,4-diisocyanatocyclohexane, 1-isocyanato-3,3,5-trimethyl-5-isocyanato-methyl-cyclohexane, 1-isocyanato-1-methyl-4-isocyanatomethyl-cyclohexane and 4,4-diisocyanatodicyclohexyl-methane, or any desired mixtures of such diisocyanates.

The reaction products, of the abovementioned diisocyanates, which contain uretdione, isocyanurate, allophanate or oxadiazine groups and are preferably to be used are essentially polyisocyanate mixtures which comprise trimeric 1,6-diisocyanatohexane or 1-isocyanato-3,3,5-trimethyl-5-isocyanatomethylcyclohexane and the corresponding higher homologues, contain isocyanurate groups and, if appropriate, uretdione groups and have an NCO content of 19 to 24% by weight. The polyisocyanates which are particularly preferably employed are the corresponding polyisocyanates of the NCO content mentioned which are largely free from uretdione groups and contain isocyanurate groups, such as are obtained by catalytic trimerization, which is known per se, and with isocyanurate formation, of 1,6-diisocyanatohexane or 1-isocyanato-3,3,5-trimethyl-5-isocyanatomethyl-cyclohexane and preferably have an (average) NCO functionality of 3.2 to 4.2. The trimeric polyisocyanates having an NCO content of 19 to 24% by weight which are obtained by reaction of 1,6-diisocyanatohexane with a deficit of water in a known manner and contain essentially biuret groups are also preferred.

Further suitable, although not preferred, polyisocyanates are aliphatic or aromatic diisocyanates, such as hexamethylene diisocyanate, toluene diisocyanate, 1,5-diisocyanatonaphthalene and diphenylmethane diisocyanate.

II. Polyisocyanates which contain ester and/or amide structures, as reaction products of diisocyanates with polyhydroxy compounds, such as are described in DE-A-4 446 334. These modified polyisocyanates are suitable for improving the pulpability of the polyisocyanates employed according to the invention.

III. The polyalkylene oxide ether alcohols mentioned under II. are preferably mono- or polyvalent polyalkylene oxide polyether alcohols which contain, as a statistical average, 5 to 70, preferably 6 to 60, ethylene oxide units per molecule, such as are accessible in a manner known per se by alkoxylation of suitable starter molecules.

Any desired mono- or polyhydric alcohols of molecular weight range 32 to 150 g/mol, such as are also used, for example, according to EP-A-0 206 059, can be employed as starter molecules for the preparation of these polyalkylene oxide polyether alcohols. Monofunctional aliphatic alcohols having 1 to 4 carbon atoms are preferably used as starter molecules. The use of methanol or ethylene glycol monomethyl ether is particularly preferred. Alkylene oxides which are suitable for the alkoxylation reaction are, in particular, ethylene oxide and propylene oxide, which can be employed in the alkoxylation reaction in any desired sequence or else as a mixture.

The abovementioned polyalkylene oxide polyether alcohols are either pure polyethylene oxide polyethers or mixed polyalkylene oxide polyethers which have at least one polyether sequence which has at least 5, in general 5 to 70, preferably 6 to 60, and particularly preferably 7 to 20, ethylene oxide units, the alkylene oxide units of which consist of ethylene oxide units to the extent of at least 60 mol %, preferably to the extent of at least 70 mol %.

Preferred such polyalkylene oxide polyether alcohols are monofunctional polyalkylene oxide polyethers which are started on an aliphatic alcohol containing 1 to 4 carbon atoms and contain, as a statistical average, 6 to 60 ethylene oxide units. Particularly preferred polyalkylene oxide polyether alcohols are pure polyethylene glycol monomethyl ether alcohols which contain, as a statistical average, 7 to 20 ethylene oxide units.

Suitable polyalkylene oxide polyethers containing ester groups are polyester-ethers which have terminal OH groups, are obtainable by reaction of aliphatic $C_2$- to $C_8$-dicarboxylic acids or esters or acid chlorides thereof with polyethers from the group consisting of polyethylene oxides, polypropylene oxides and mixtures thereof and copolyethers thereof, 0.8 to 0.99 equivalents of carboxyl groups or derivatives thereof being employed per OH equivalent of the polyether, and have an average molecular weight below 10,000 g/mol, preferably below 3,000 g/mol, and hydroxyl end groups.

IV. Possible compounds which contain both one or more groups which are reactive towards isocyanates and at least one cationically charged tertiary amino group and/or ammonium group are amines such as are described in EP-A-582 166 and DE-A-4 436 058. Examples which may be mentioned are compounds having at least one tertiary amino group and at least one primary amino and/or hydroxyl function, such as, for example, N,N-dimethylethylenediamine, N,N-dimethylpropylenediamine, amino-alcohols, such as N,N-dimethylethanolamine, N,N-diethylethanolamine, N,N-dimethylpropanolamine, diethylpropanolamine and the like, methyl-bis(2-hydroxyethyl)-amine, triethanolamine, reaction products of triethanolamine with ethylene oxide and/or propylene oxide, polyesters having terminal hydroxyl groups, polyester-amides having terminal hydroxyl groups or terminal amino groups, and hydroxy-functional polyamines and polyamidoamines. The tertiary amino function of the compounds described can furthermore be completely or partly converted into ammonium groups by protonation and/or quaternization.

V. Possible compounds which contain both one or more groups which are reactive towards isocyanates and at least one anionically charged group, for example carboxyl and/or sulphonate group and/or potentially anion-forming group, are compounds which simultaneously contain hydroxyl groups and carboxyl groups, such as, for example, hydroxyacetic acid, lactic acid, 2,2-bis(hydroxy)propionic acid, malic acid, tartaric acid, citric acid and the like.

Examples which may be mentioned of compounds which simultaneously contain amino groups and carboxyl groups are: glycine, alanine, 4-aminobutyric acid, 6-aminocaproic acid, aspartic acid and glutamic acid.

Examples which may be mentioned of compounds which simultaneously contain hydroxyl groups and sulphonic acid groups are: hydroxymethanesulphonic acid and hydroxyethanesulphonic acid. Compounds which simultaneously contain amino groups and sulphonic acid groups are, for example, taurine, N-methyltaurine and 2-butylaminoethanesulphonic acid. The derivatives of the carboxylic and sulphonic acid which are obtainable by salt formation on the acid function of course are also active and can also be employed here.

The water-dispersible polyisocyanates used according to the invention are preferably in nonionic or anionic form. It is furthermore possible to employ polyisocyanates which are in cationic form. It is moreover also possible to employ polyisocyanates which comprise both cationic compounds according to IV and anionic compounds according to V and thus have a betaine structure.

The preparation of the water-dispersible polyisocyanates is described, for example, in DE-A-4 211 480, EP-A-0 582 166, DE-A4 436 058 and 4 446 334. They are prepared by reaction of components I. to V. mentioned, with exclusion of moisture, preferably without a solvent. They are easy to handle industrially and, with exclusion of moisture, are storage-stable for months.

Preferred synthetic binders are styrene/butadiene, styrene/butyl acrylate, and acrylic ester polymers and copolymers, vinyl acetate polymers and copolymers and polyurethanes.

The coating slips according to the invention are particularly suitable for use on high-speed coating machines. They furthermore ensure fastness of optically brightened coating slips to bleeding.

The invention furthermore relates to a process for the production of coated substrates, in particular papers and boards, characterized in that a coating slip according to the invention is used. The coating slips can be applied on customary coating machines, which operate either on-line or off-line. The mode of application is either single-sided or double-sided. The coating slips can be applied as a single coating or a multiple coating, for example divided into a precoating and topcoating.

Preferred application processes are, for example, cast, brush, airbrush, roller, doctor and scraper or blade processes and variants thereof, in particular blade coating processes with a single and multiple coating, such as are described, for example, in the journal "Das Papier" 10 (1986), Volume 10a, p. 125 et seq.

In a preferred embodiment, the coating slips according to the invention comprise, in addition to the binders and water-dispersible polyisocyanates, pigments and, if appropriate, optical brighteners. However, it is also possible for the total amount of the pigments or a part thereof to be incorporated in a separate layer and for the coating slip according to the invention to be applied, for example, by the cast coating process.

Procedure for the process according to the invention

To carry out the process according to the invention, the water-dispersible polyisocyanates are employed, preferably without an organic solvent, and are either dispersed directly in the coating colour or predispersed in water. The products are very easy to disperse in water, the active compound content of the dispersion being up to 70% by weight, preferably 10 to 50% by weight. The mixing units customary in the art (stirrers, mixers with the rotor-stator principle and, for example, high pressure emulsifying apparatuses) are suitable for the dispersing operation.

The preferred polyisocyanates are self-dispersing, i.e. after addition to the aqueous phase or to the coating colour, they can be dispersed easily, even without the action of high shearing forces. As a rule, a static mixer is sufficient. The resulting aqueous dispersions can then be added directly to the coating colour. The dispersions have a certain processing time of about 12 to 24 hours, the processing time depending on the structure of the polyisocyanates to be employed according to the invention, and also on the temperature, pH and concentration of the polyisocyanates in the dispersion. The processing time is defined as the time in which the optimum dry and wet strength action is achieved.

To facilitate the incorporation into water or the coating colour, it may be expedient for the water-dispersible polyisocyanate mixture to be employed according to the invention to be employed as a solution in a solvent which is inert towards isocyanate groups. Suitable solvents are, for example, ethyl acetate, ethylene glycol diacetate, propylene glycol diacetate, 2-butanone, 2-methoxypropyl 2-acetate, toluene or mixtures thereof. The proportion of solvents in the solution of the polyisocyanate should preferably be not more than 50% by weight. However, the use according to the invention of solvent-free water-dispersible polyisocyanates is particularly preferred.

According to the invention, the water-dispersible polyisocyanates are employed in paper-coating slips which are known per se.

The paper-coating slips according to the invention usually comprise (in % by weight):

a) 100 parts of coating pigment comprising 0 to 100% of China clay (kaolin), 0 to 100% of ground or precipitated calcium carbonate and, if appropriate, 0 to 60% of further coating pigments, such as talc, satin white, aluminium hydroxide and titanium dioxide or gypsum, the sum of all the pigment components being 100%;

b) 5 to 20% (based on the coating pigment) of a synthetic binder;

c) if appropriate 0.01 to 20% of a naturally occurring binder, such as starch, casein and the like;

d) if appropriate 0.01 to 5% of a cobinder, such as polyethylene glycol, polyvinyl alcohol, polyvinylpyrrolidone, carboxymethylcellulose, alginates, guars and copolymers of acrylic acid or methacrylic acid with alkyl esters of acrylic acid or methacrylic acid;

e) if appropriate 0.01 to 5% of an optical brightener, such as products based on 4,4'-diaminostilbenesulphonic acid, such as triazinyl derivatives of 4,4'-diaminostilbenesulphonic acid, distyrylbenzene, distyrylbiphenyl, stilbenyl-2H-triazole, certain benzoxazoles or benzofurans, coumarins and the like;

f) 0.01 to 5% of water-dispersible polyisocyanates, which can be in nonionic, anionic or cationic and, if appropriate, also amphoteric form. The water-dispersible polyisocyanates are preferably in nonionic, anionic or cationic form, particularly preferably nonionic or anionic, in order to avoid, where appropriate, undesirable interactions between the charge of the polyisocyanates and that of the anionic coating colour. In cationic coating colours (Wochenblatt für Papierfabrikation, 1993, 13, pages 549–55), polyisocyanates in cationic form can be of particular advantage.

g) In addition, the paper-coating slips can also comprise, inter alia, in a small amount:
dispersing agents, such as are used, for example, for dispersing the coating pigments, thickeners, wetting agents, releasing agents, such as Na or Ca stearates, shading dyestuffs, defoamers, agents for regulating the pH and the like.

The coating colours according to the invention have a solids content of preferably 60–70% and a viscosity of preferably 1000–4000 MPas (measured with a Brookfield viscometer at 100 rpm), higher and lower values also being possible. It is essential that the viscosity remains largely stable over the processing time of up to about 12 hours and does not rise substantially, since otherwise processing problems are to be expected. The good dispersion stability of the coating colour according to the invention under a high electrolyte and shear loading is particularly advantageous.

A customary glossed, wood-containing or wood-free coating base paper or board having a weight per unit area of 25 to 400 g/m² can be used as the substrate for application of the coating colour used according to the invention. However, a coating carrier, preferably of the same substrate, provided with a precoating can also be employed. Customary application weights for the coating slip are 5 to 25 g/m² per side, it also being possible for this application amount to be applied by multiple coatings. However, higher and lower application amounts can also be used.

EXAMPLE 1

To prepare a paper-coating slip, 40 parts of China clay and 60 parts of calcium carbonate were dispersed in an approximately 60% strength aqueous suspension with the addition of 0.25 part of a dispersing agent based on a low molecular weight polyacrylate with the aid of a high-speed stirrer. Twelve parts (based on 100 parts of pigment) of an aqueous dispersion of a styrene/butadiene copolymer were added as a binder to the pigment suspension. The parts stated in Table 1 of a nonionic polyisocyanate which was prepared in accordance with DE-4 211 480, Example 1, were added, while stirring vigorously. The solids content of the coating colour was adjusted to about 60% by addition of water and the pH was adjusted to 8.5 with sodium hydroxide solution. After a mixing time of 10 minutes, the paper-coating colour was applied on a coating unit to one side of a wood-free base paper having a weight per unit area of 81 g/m². The amount applied was 11–12 g/m². The paper was satinized on a super calender (30 m/min, 90° C., 220 kN/m). The coated papers had the test data summarized in Table 1.

TABLE 1

| Polyisocyanates in the paper coating | | | | | |
|---|---|---|---|---|---|
| Addition of polyisocyanate according to DE-A-4 211480 Ex. 1 | % by weight based on the pigment | — | 0.2 | 0.5 | 1.0 |
| Solids content | % by weight based on the coating slip | 59.9 | 60.1 | 60.1 | 60.1 |
| Brookfield viscosity (100 rpm) | mPas | 680 | 720 | 720 | 700 |
| pH | | 8.5 | 8.7 | 8.5 | 8.5 |
| Coating weight | g/m² | 11.5 | 12.1 | 11.6 | 10.5 |
| Gloss, paper 75° | % | 73 | 74 | 75 | 76 |
| Wet picking | Lor.No. | 3802 | 3803 | 3803 | 3804 |
| Ink repellance L3810 | % ink acceptance | 14 | 18 | 28 | 36 |

The Example showed that the wet strength and printability values could already be improved by the use of small amounts of the polyisocyanates described. As shown in Table 1, the polyisocyanate used according to the invention increased the gloss, significantly improved the wet picking resistance and reduced the ink repellance.

EXAMPLE 2

40 parts of China clay and 60 parts of calcium carbonate were dispersed in an approximately 60% strength aqueous suspension with the addition of 0.25 part of a dispersing agent based on a low molecular weight polyacrylate with the aid of a high-speed stirrer. 10 parts (based on 100 parts of pigment) of an aqueous dispersion of a styrene/butadiene copolymer (BAYSTAL P 1800) were added as a binder to the pigment suspension. The optical brightener of the formula

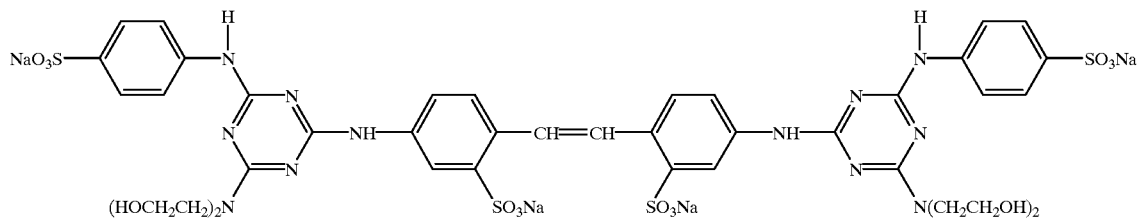

(as a 25% strength aqueous solution)
and the polyisocyanates mentioned in Table 2 were added, while stirring vigorously. The solids content of the coating colour was adjusted to 60% by addition of water and the pH was adjusted to 9 with sodium hydroxide solution. After a mixing time of 10 minutes, the paper-coating colour was applied with the aid of a doctor to a wood-free base paper (70 parts of hard wood sulphate, 30 parts of soft wood sulphate, 10% of chalk, sized) having a weight per unit area of 80 g/m². The amount applied was 12 g/m². The papers were dried on a drying cylinder and tested for whiteness and fastness to bleeding. The coated papers had the test data summarized in Table 2.

TABLE 2

Fixing of brightner in cobinder-free coating colour
Concentration used in % by weight based on the pigment.

| Experiment | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Brightener | 0.5 | 0.5 | 0.5 | 0.5 | 0.5 | 0.5 | 0.5 | 1 | 1 | 1 | 1 | 1 | 1 | 1 |
| Polyisocyanate according to DE-A-4 211 480 Ex. 1 | | | 0.5 | 1 | | | | | | 0.5 | 1 | | | |
| Polyisocyanate according to DE-A-4 226 110 Ex. 16 as an 80% strength solution in propylene glycol acetate | | | | | 0.5 | 1 | | | | | | 0.5 | 1 | |
| Polyisocyanate according to Le A 30 975 Ex. 1 | | | | | | | 0.5 | 1 | | | | | 0.5 | 1 |
| Evaluation | | | | | | | | | | | | | | |
| CIE whiteness | 82.8 | 84.3 | 84.8 | 83.9 | 85.6 | 84.1 | 85.3 | 82.7 | 84.1 | 87.4 | 84.7 | 86.6 | 85.4 | 86.4 |
| Fastness to bleeding, water (DIN 53991 Part 2) | 4 | | 5 | | 5 | | 4–5 | 4 | | 4–5 | | 5 | | 4–5 |

As Table 2 shows, both a significant increase in the whiteness and a significant improvement in the fastness to bleeding were achieved by the addition of the polyisocyanates used according to the invention. In contrast, customary crosslinking agents, such as, for example, cationic epichlorohydrin resins, led both to an undesirable increase in the viscosity and to a drastic drop in whiteness.

EXAMPLE 3

Example 2 was repeated with a coating colour which additionally comprised 1.5% of polyvinyl alcohol as a cobinder. As Table 3 shows, in this case also a significant increase in the whiteness could again be achieved by the use according to the invention of the polyisocyanates.

TABLE 3

Fixing of brightener in cobinder-containing coating colour (1.5% of PVA)
Concentration used in % by weight based on the pigment

| Experiment | 1 | 2 | 3 | 4 | 5 | 6 | 7 | 8 | 9 | 10 |
|---|---|---|---|---|---|---|---|---|---|---|
| Brightener | 0.5 | 0.5 | 0.5 | 0.5 | 0.5 | 1 | 1 | 1 | 1 | 1 |
| Polyisocyanate according to DE-A-4 211 480 Ex. 1 | | 0.5 | 1 | | | | | 0.5 | 1 | |
| Polyisocyanate according to Le A 30 975 Ex. 1.1 | | | | 0.5 | 1 | | | | | 0.5 | 1 |

TABLE 3-continued

Fixing of brightener in cobinder-containing coating colour (1.5% of PVA)
Concentration used in % by weight based on the pigment

| Experiment | 1 | 2 | 3 | 4 | 5 | 6 | 7 | 8 | 9 | 10 |
|---|---|---|---|---|---|---|---|---|---|---|
| Evaluation | | | | | | | | | | |
| CIE whiteness | 99.8 | 101.1 | 101.7 | 101.2 | 101.9 | 102.6 | 104.7 | 105.5 | 105.4 | 107.2 |

EXAMPLE 4

Example 2 is repeated with a coating colour of 70 parts of chalk and 30 parts of China clay, 8 parts of an aqueous dispersion of a styrene/butadiene copolymer as the binder and 1 part of polyvinyl alcohol. 0.8 part of optical brightener of the formula

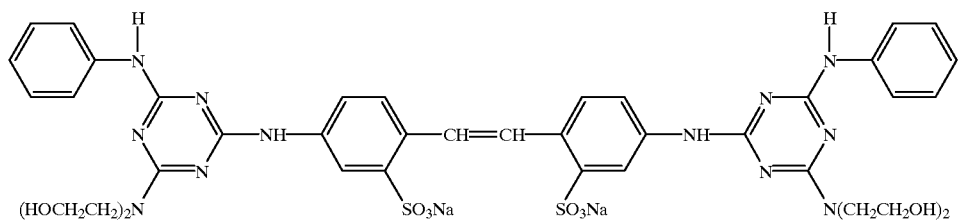

(as a 22% strength solution)
and the amount of polyisocyanate stated in Table 4 are added.

As Table 4 shows, in this case a substantial increase in the whiteness and a significant improvement in the fastness to bleeding in acetic acid can be achieved.

TABLE 4

Fixing of brightener in cobinder-containing coating colour (1% of PVA)
Concentration employed in % by weight based on the pigment

| Experiment | 1 | 2 | 3 | 4 | 5 |
|---|---|---|---|---|---|
| Brightener 2 | 0.8 | 0.8 | 0.8 | 0.8 | 0.8 |
| Polyisocyanate according to DE 4 211 480 Ex. 1 | 0 | 0.25 | 0.5 | 1 | 2 |
| Evaluation | | | | | |
| CIE whiteness | 95.4 | 97.0 | 98.6 | 99.8 | 100.6 |
| Fastness to bleeding, water | 5 | 5 | 5 | 5 | 5 |
| Fastness to bleeding, acetic acid | 4 | 4–5 | 5 | 5 | 5 |

EXAMPLE 5

In this Example, the total amount of wet strength agent was divided up into use in the paper pulp, in the sizing press and in the paper coating.

The Example shows that if conventional wet strength agents based on polyamidoamine/epichlorohydrin resins were used, use in the sizing press produced only slight advantages over use in the pulp, while use in the coating was no longer possible at all for viscosity reasons.

In contrast, if polyisocyanates were employed in the surface or in the paper coating, if appropriate divided into precoating and topcoating, a significant increase in the wet breaking load was possible in ranges which could no longer be covered by conventional epichlorohydrin resins. In addition, in combination with an optical brightener, the polyisocyanates resulted in advantages in whiteness, while cationic epichlorohydrin resins had an adverse effect on whiteness, owing to fluorescence quenching.

TABLE 5

Division of the use of wet strength agents into pulp and surface use
Amount employed in % by weight of active substance based on the paper

| Experiment | Wet strength agent | Pulp | Sizing press | Pre-coating | Top-coating | Wet breaking load (N) |
|---|---|---|---|---|---|---|
| 1 | none | | | | | 0.5 |
| 2 | Epichlorohydrin resin * | 0.3 | | | | 4 |
| 3 | Epichlorohydrin resin * | 0.15 | 0.15 | | | 5.2 |
| 4 | Epichlorohydrin resin * | | 0.15 | | | 4.5 |
| 5 | Epichlorohydrin resin * | | 0.3 | | | 6.7 |
| 6 | Polyisocyanate according to DE-A-4 211 480 Ex. 1 | 0.3 | | | | 3.4 |
| 7 | Polyisocyanate according to DE-A-4 211 480 Ex. 1 | | 0.15 | | | 8.8 |
| 8 Invention | Polyisocyanate according to DE-A-4 211 480 Ex. 1 | | 0.15 | 0.15 | | 10.7 |
| 9 Invention | Polyisocyanate according to DE-A-4 211 480 Ex. 1 | | 0.15 | 0.075 | 0.075 | 10.5 |

* The polyamidoamine/epichlorohydrin resin was a 15% strength aqueous solution

We claim:

1. A pigmented coating slip suitable for the production of coated papers and boards comprising
    (a) a coating pigment,
    (b) 5 to 20%, based on the amount of the coating pigment, of at least one synthetic binder,
    (c) optionally, 0.01 to 20%, based on the amount of the coating pigment, of a naturally occurring binder,
    (d) optionally 0.01 to 5%, based on the amount of the coating pigment, of a cobinder,
    (e) 0.01 to 5%, based on the amount of the coating pigment, of an optical brightener,
    (f) 0.01 to 5%, based on the amount of the coating pigment, of at least one water-dispersible polyisocyanate, and
    (g) optionally, additives.

2. A coating slip according to claim 1 wherein the polyisocyanate is a mixture of isocyanates that are polyether-modified and isocyanates that are not polyether-modified, said mixture containing 2 to 60% by weight, based on the mixture, of alkylene oxide units.

3. A coating slip according to claim 1 wherein the polyisocyanate is obtained by reaction, in any desired sequence, of
    (I) one or more unmodified polyisocyanates having an NCO functionality of 1.8 to 4.2,
    (II) optionally, one or more polyisocyanates containing ester and/or amide structures,
    (III) one or more polyalkylene oxide polyether alcohols,
    (IV) optionally, one or more compounds containing both at least one group that is reactive towards isocyanates and at least one cationically charged tert-amino group and/or ammonium group, and
    (V) optionally, one or more compounds containing both at least one group that is reactive towards isocyanates and at least one anionically charged group and/or potentially anion-forming group.

4. A coating slip according to claim 1 wherein the synthetic binder is a styrene/butadiene, styrene/butyl acrylate, or acrylic ester polymer or copolymer; a vinyl acetate polymer or copolymer; or a polyurethane.

5. A process for the preparation of a coated paper or board comprising applying a coating slip according to claim 1 to the paper or board.

6. A process according to claim 5 wherein the coating slip is applied to the paper or board using a high-speed applicator machine.

7. A coated paper or board coated with a coating slip according to claim 1.

* * * * *